April 5, 1960 H. MARTIN 2,931,101
MOUNTING DEVICE OF SIGHTING TELESCOPES ON FIREARMS
Filed Jan. 17, 1956 2 Sheets-Sheet 1

Hermann Martin
INVENTOR.

BY

AGENT.

April 5, 1960  H. MARTIN  2,931,101
MOUNTING DEVICE OF SIGHTING TELESCOPES ON FIREARMS
Filed Jan. 17, 1956  2 Sheets-Sheet 2

Hermann Martin
INVENTOR.

BY Karl F. Ross
AGENT.

United States Patent Office 2,931,101
Patented Apr. 5, 1960

2,931,101
MOUNTING DEVICE OF SIGHTING TELESCOPES ON FIREARMS

Hermann Martin, Hamburg-Wandsbeck, Germany

Application January 17, 1956, Serial No. 559,755

11 Claims. (Cl. 33—50)

Hitherto sighting telescopes were mounted mechanically on fire arms by means of screws, clamps or the like. Attachment by means of screws requires much time so that the sighting telescope must remain permanently fixed to the arm. In case of mounting by means of clamping, a tight attachment of the sighting telescope on the bearings of the fire arm is not easily achieved, thus causing inaccuracies which impair aiming precision.

It is the object of the invention to provide means for a quick mounting of the sighting telescope on the fire arm and insuring nevertheless a tight and accurate fit between the bearings of the fire arm and the adjacent portions of the sighting telescope by using permanent magnets of very high field intensity as bonding magnets between the fire arm and the telescopic sight. Thereby it is also possible to adjust the sighting telescope in lateral direction since in spite of the high bonding effect of the magnets a lateral displacement of the magnets on the magnet keeper, thus parallel to the bearing face, easily is possible. The sighting telescope may be adjusted also vertically by arranging a permanent magnet or its magnet keeper in the telescopic sight or the fire arm adapted vertically to be screwed and fixed. The bond between the magnets and the magnet keepers may be further increased by providing the magnet keepers also as permanent magents with very high field intensity. If the requirement for exact fit of the sighting telescope is less stringent, one of the two mounting devices may also be a mechanical locking arrangement. The precision of the shot is increased considerably by the use of bonding magnets.

The drawing shows several embodiments of the invention. Therein:

Fig. 1 diagrammatically shows a side view of a sighting telescope attached to the fire arm by two magnet devices;

Figure 1:
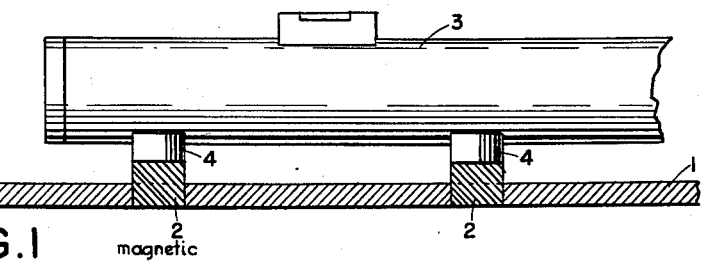

According to Fig. 1, two permanent magnets 2 of high field intensity are sunk into an element 1 of the fire arm, e.g. shrunk, riveted or screwed therein, and on the telescopic sight 3 a pair of magnet keepers or armatures 4, of soft iron and of a diameter equal to that of the permanent magnets, are attached. These magnet keepers 4 might also be strong permanent magnets. The magnet keepers 4 may easily be displaced in longitudinal and lateral directions on the magnets 2 to such an extent that the magnets and the magnet keepers extend flush and the telescope thus fits accurately.

Figure 2:
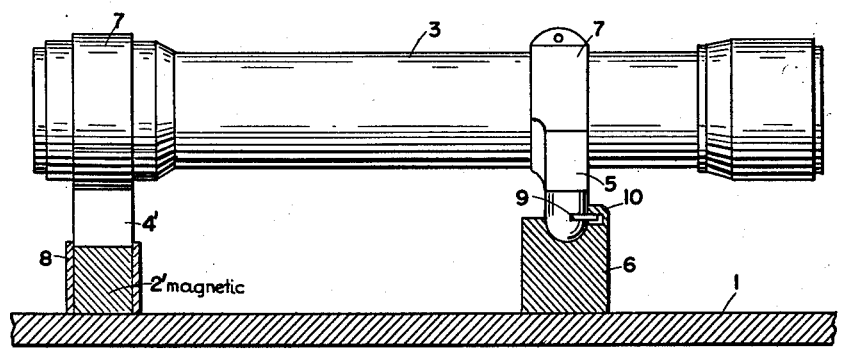
Fig. 2 shows a similar assembly having one magnetic and one mechanical mounting device.

According to Fig. 2, there is arranged on the magnet keeper 4′ a resilient sleeve 8 of non-magnetizable material, e.g. spring bronze, which has a longitudinal slot and may be shifted downwardly after exact positioning of the magnet keeper 4′ on the magnet 2′, this sleeve 8 being sufficiently long when resting on the rifle portion 1 to cover the dividing faces between the elements 2′ and 4′ so as to guarantee an accurate fit in lateral direction.

The other foot 5 of the telescope 3 is constructed as a round (rotatable) pivot with a semi-annular slightly wedge-shaped rib 9 fastened thereon which engages a hook 10 of a socket element 6 on the rifle portion 1.

For releasing the sighting telescope, the sleeve 8 is shifted upwardly onto the magnet keeper 4′ and the sighting telescope 3 is pivoted by approximately 90° about this pivot 5 so that the pivot 5 may be lifted out of the socket 6. When the pivot 5 is reinserted in the socket 6, the wedge-like semi-annular rib 9 is fixedly clamped under the hook 10 and presses the pivot 5 strongly onto the socket element 6.

The magnet keeper or armature 4′ and the pivot 5 are fastened to the telescope by means of rings 7. The magnet keeper 4′ may likewise be a permanent magnet.

Figure 3:
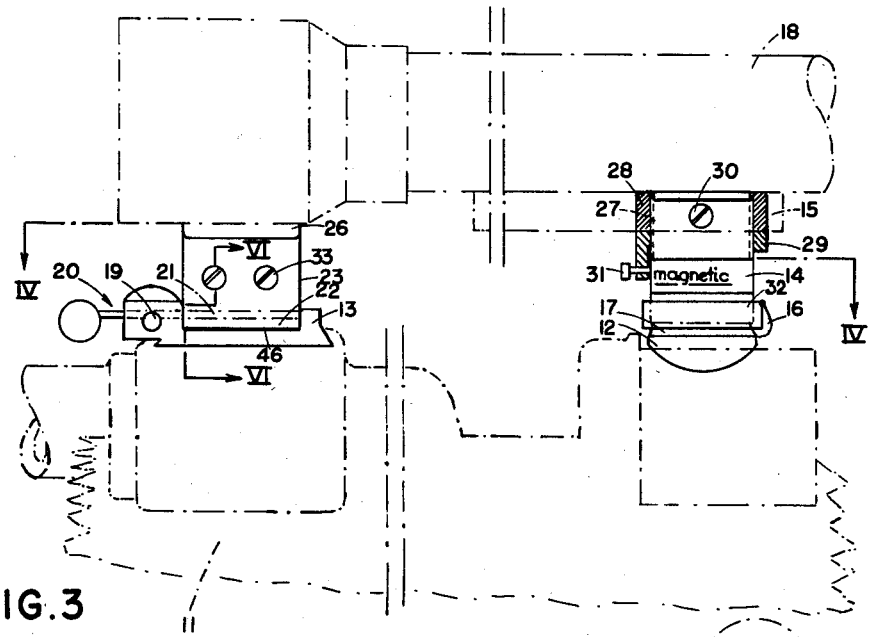
Fig. 3 shows another sighting telescope in side view having two magnetic mounting devices and mechanical locking means, one of the mounting devices being pivotable about a vertical axis and vertically adjustable, while the other one is adjustable in lateral direction.
Figure 4:
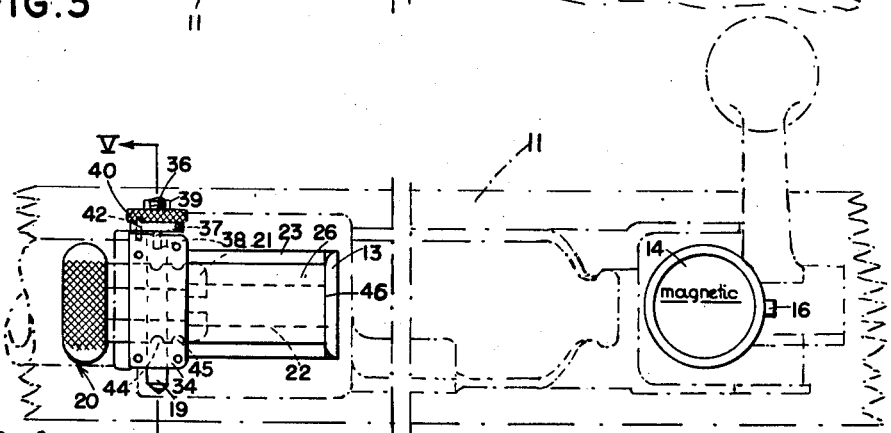
Fig. 4 is a top view of the telescope taken along line IV—IV of Fig. 3.

According to Figs. 3 and 4, a permanent magnet 14 constructed as a pivot is screwed into a sleeve 28 of the sighting telescope 18 by means of a fine thread 27; the sleeve is shrunk or soldered into a bead 15 of the telescopic sight. Thus the magnet 14 may be adjusted in vertical direction. After such adjustment, a counter-nut 29 is screwed against the sleeve 28, and then the magnet 14 is secured by a set screw 30. The counter-nut 29 likewise may be secured by a screw 31 against rotation on the magnet 14. A magnet keeper or armature 12 is fastened onto the fire arm 11 by soldering or the like. The magnet keeper 12, which may be of iron but may also be a permanent magnet, shows the same round cross-section as the magnet 14 and has an annular groove 17 below its upper seat. A sleeve 32 of non-magnetizable material fits closely yet axially shiftable on the magnet 14 and carries a hook-shaped iron latch 16 which engages the annular groove 17, upon the sleeve 32 being shifted downwardly onto the keeper 12, and is held therein magnetically. The latch 16 may also be made of brass or the like and be pressed by a spring into the annular groove 17.

Figures 5, 6, 7:
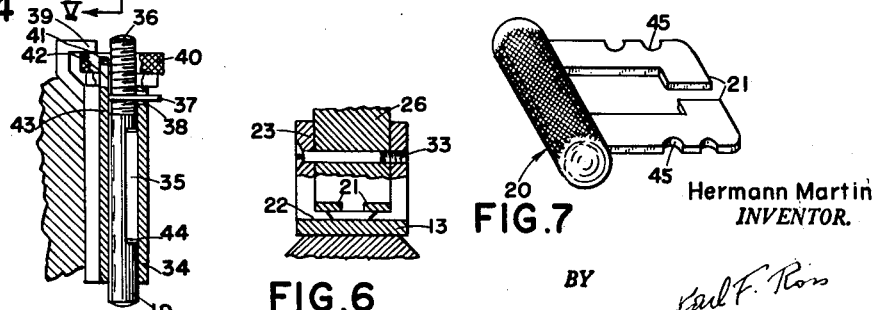
Fig. 5 is a partial longitudinal section of the mounting taken along line V—V of Fig. 4.
Fig. 6 is a partial cross-section of the mounting taken along line VI—VI of Fig. 3.
Fig. 7 is a perspective view of an element of the mechanical locking means.

According to Figs. 3 and 6, the front portion of the telescope 18 carries a magnet keeper or armature 26 of rectangular cross-section soldered or screwed thereto; two iron poles 23 which are provided at their lower end with angularly inwardly directed pole tips 22 are laterally screwed to the keeper 26 by means of screws 33.

According to Figs. 3 to 6, furthermore, in a collar of the rifle barrel 11 a magnet keeper or armature 13 is fixedly inserted by means of a dovetail; this armature has on its upper face a short arcuate transverse groove 46, whose center of curvature lies in the axis of magnet 14 and magnet keeper 12, in which the magnet poles 22, 23 are slidable in transverse direction. The space between the magnet 26 and the poles 22, 23 is occupied by the laterally somewhat resilient prongs 21 of a bifurcated latch 20 which can be displaced sideways, as hereinafter described, to fix the pole tips 22, 23 and thus the sighting telescope in a selected position of lateral adjustment. The prongs 21 extend through two longitudinal slots of a horizontal sleeve 34 fastened on the fire arm and lie in a horizontal longitudinal recess 35 of a bolt 19 which is axially shiftable in the sleeve and has a threaded extension 36 which is secured against turning by a transverse pin 37 sliding in a narrow longitudinal slot 38 of the sleeve 34. A nut 40 is threadable on the thread extension 36 of the bolt 19 between the left-hand face of the sleeve 34 (as viewed in Fig. 5) and a hook 39 of the sleeve 34 in order to displace the bolt 19 in the lateral direction of the fire arm and thus laterally to adjust, by means of the prongs 21, also the pole tips 22, 23 together with the telescope 18. A cylindrical locking pin 42, biased by means of a spring 41, is axially displaceable in the nut 40 and resiliently engages projections 43 on the face of the sleeve 34 in order to retain the nut 40 and thus the bolt 19 in their adjusted position.

The longitudinal recess 35 of the bolt 19 contains lateral projections 44 which engage the lateral recesses 45 of the prongs 21.

For assembly, the magnet 14 is placed on its magnet keeper 12 and the sleeve 32 is shifted downwardly until the latch 16 engages the annular groove 17. The latch 20, 21 is drawn forwardly until the prongs 21 clear the transverse groove 46 of the keeper 13, and then the magnet 26 together with its pole tips 22, 23 is swung about its pivot 12, 14 into the transverse groove 46, whereupon the latch 20, 21 is urged between the pole tips 22, 23. The sighting telescope is released in the reverse succession.

The seats of the permanent magnets and of the magnet keepers are finely ground so that the magnets rest very tightly in operation on the seats of the magnet keepers and accuracy of aiming is increased.

What I claim is:

1. A mounting device for detachably securing the body of a sighting telescope to the body of a fire arm, comprising a pair of ferromagnetic members including a permanent-magnet member carried on one of said bodies and a ferromagnetic armature member carried on the other of said bodies, said armature member registering with said magnet member and being attracted thereby, and fastening means on one of said bodies movable relatively to said members and positionable to effect a mechanical interlocking between said magnet member and said armature member.

2. A mounting device according to claim 1, further comprising an additional pair of ferromagnetic members including a permanent-magnet member and a co-operating ferromagnetic armature member respectively carried on said bodies, said additional pair being longitudinally spaced from the first-mentioned pair.

3. A mounting device according to claim 1, further comprising a pivot element and a mating socket element respectively carried on said bodies at a distance from said pair of members, said elements being provided with interlocking formations adapted to be disengaged from each other upon relative rotation of said bodies around an axis passing through said elements.

4. A mounting device according to claim 1, wherein said armature member is also permanently magnetic.

5. A mounting device according to claim 1, wherein both of said members are substantially cylindrical and of like cross-section, said fastening means comprising a sleeve of non-magnetizable material slidably surrounding one of said members.

6. A mounting device according to claim 5, wherein said sleeve is provided with latch means for releasably retaining it in a position bridging both of said members.

7. A mounting device according to claim 1, further comprising adjusting means for varying the effective spacing of one of said members from the body on which it is carried.

8. A mounting device according to claim 1, wherein one of said members is provided with a recess, said fastening means comprising a latch member longitudinally slidable on the body carrying the other of said members for retractably entering said recess.

9. A mounting device according to claim 8, wherein the body carrying said one member is provided with a transverse groove slidably receiving said one member and is further provided with adjustable mounting means for said latch member enabling transverse displacement of the latter.

10. A mounting device for detachably securing the body of a sighting telescope to the body of a fire arm, comprising a first mounting element carried on one of said bodies and a second mounting element carried on the other of said bodies, a pair of ferromagnetic members respectively carried on said bodies at a location longitudinally spaced from said mounting elements and including a cylindrical permanent-magnet member and a cooperating cylindrical ferromagnetic armature member of like diameter, a sleeve of non-magnetizable material slidably surrounding one of said members and movable into a position bridging both of said members, thereby securing same in a position of relative alignment while permitting relative rotation of said bodies, one of said mounting elements being provided with an arcuate transverse groove centered on the axis of said relative rotation, the other of said mounting elements being slidingly displaceable in said groove, and latch means for releasably securing said other mounting element in said groove.

11. A mounting device according to claim 10, wherein said mounting elements consist of ferromagnetic material, at least one of said elements being a permanent magnet.

References Cited in the file of this patent

UNITED STATES PATENTS

| | | |
|---|---|---|
| 1,641,880 | Cohen | Sept. 6, 1927 |
| 2,187,054 | Redfield | Jan. 16, 1940 |
| 2,372,685 | Schaich | Apr. 3, 1945 |
| 2,539,008 | Brookhyser | Jan. 23, 1951 |
| 2,589,349 | Diefenbach | Mar. 18, 1952 |
| 2,603,530 | Jones | July 15, 1952 |
| 2,613,104 | Parsons | Oct. 7, 1952 |